Sept. 18, 1951 T. MOJONNIER ET AL 2,568,653
HEAT EXCHANGE RECEPTACLE
Filed Sept. 6, 1946 9 Sheets-Sheet 1
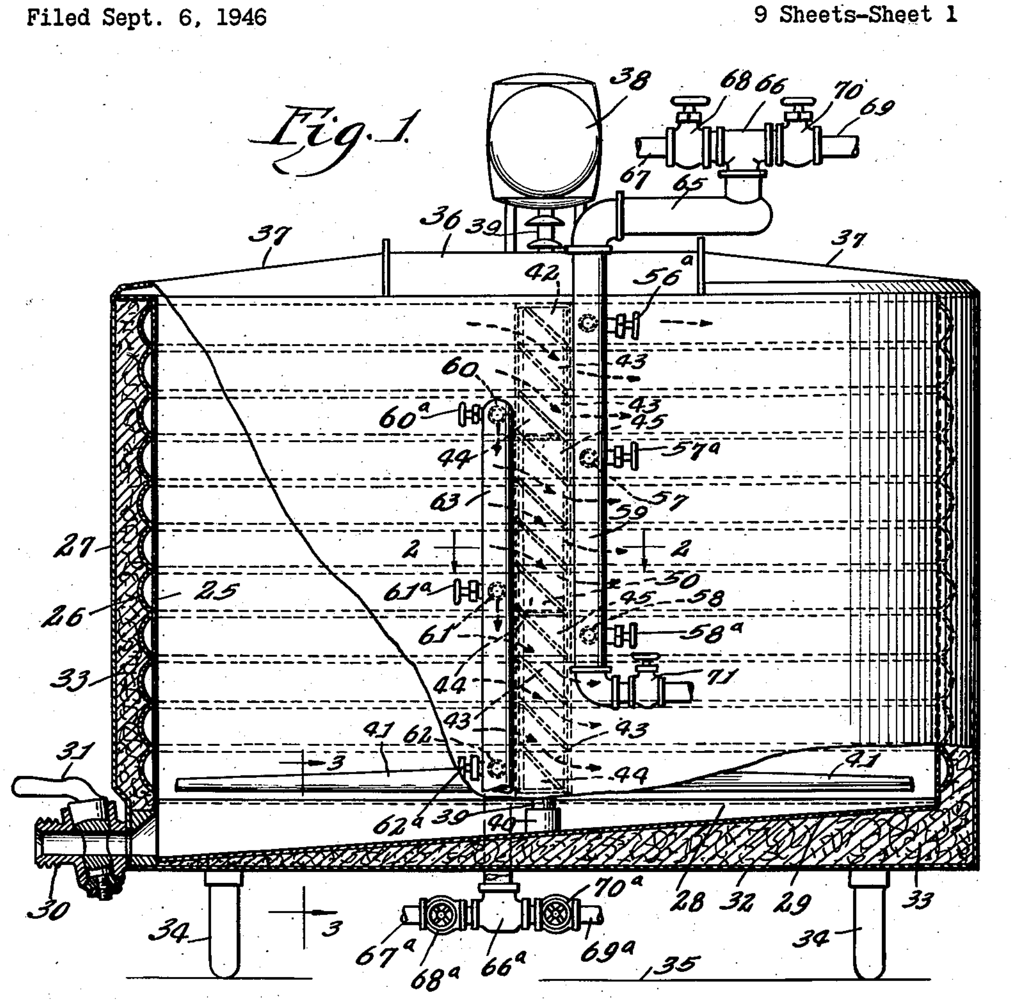
Fig. 1
Fig. 2
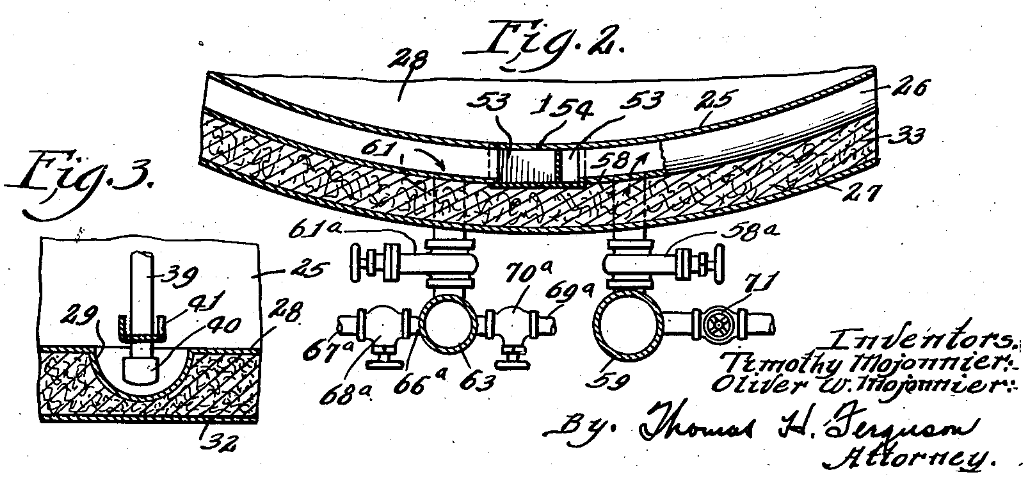
Fig. 2, Fig. 3
Inventors.
Timothy Mojonnier.
Oliver W. Mojonnier.
By. Thomas H. Ferguson
Attorney.

Inventors:
Timothy Mojonnier.
Oliver W. Mojonnier.
By Thomas H. Ferguson
Attorney.

HEAT EXCHANGE RECEPTACLE

Filed Sept. 6, 1946 9 Sheets-Sheet 3

Inventors.
Timothy Mojonnier:-
Oliver W. Mojonnier:-
By Thomas H. Ferguson
Attorney.

HEAT EXCHANGE RECEPTACLE

Inventors
Timothy Mojonnier
Oliver W. Mojonnier
By. Thomas H. Ferguson
Attorney.

Inventors:
Timothy Mojonnier:-
Oliver W. Mojonnier:-
By. Thomas H. Ferguson
Attorney.

Inventors.
Timothy Mojonnier:-
Oliver W. Mojonnier:-
By. Thomas H. Ferguson
Attorney.

Sept. 18, 1951 T. MOJONNIER ET AL 2,568,653

HEAT EXCHANGE RECEPTACLE

Filed Sept. 6, 1946 9 Sheets-Sheet 7

Inventors.
Timothy Mojonnier:
Oliver W. Mojonnier:
By. Thomas H. Ferguson
Attorney.

Inventors.
Timothy Mojonnier.
Oliver W. Mojonnier.
By. Thomas H. Ferguson
Attorney.

Inventors
Timothy Mojonnier
Oliver W. Mojonnier
By. Thomas H. Ferguson
Attorney.

Patented Sept. 18, 1951 2,568,653

UNITED STATES PATENT OFFICE 2,568,653

HEAT EXCHANGE RECEPTACLE

Timothy Mojonnier, Oak Park, and Oliver W. Mojonnier, River Forest, Ill., assignors to Mojonnier Bros. Co., a corporation of Illinois Application September 6, 1946, Serial No. 695,148

6 Claims. (Cl. 257—208)

The present invention relates to receptacles which are heated or cooled by flowing a suitable temperature conditioning medium through a novel arrangement of wall channels or ducts.

In some instances, both a heating fluid or medium and a cooling fluid or medium are used in succession, as, for example, in a milk pasteurizer. In other instances, only a cooling or refrigerating medium is used. Likewise also, a heating medium may be used alone.

One object of the invention is to construct the receptacle with a smooth exterior and a smooth interior with a minimum over all wall thickness. This is accomplished preferably by constructing the wall with a temperature conditioning portion of substantially uniform thickness and covering it with a substantially uniform thickness of insulation.

Another object is to provide the wall structure with a plurality of temperature conditioning zones so that one or more zones may be used according to the size of the batch being treated.

Another object is to produce a wall structure by uniting a performed corrugated sheet to a plain sheet in such a manner as to provide a jacketing space therebetween comprising a series of independent parallel ducts terminating on opposite sides of an intervening space and to place in the intervening space special connections which serve to unite the opposing passages.

In its broader aspect the connecting means placed in said intervening space comprises one or more sheet metal channel-forming members which comprise a central channel-forming space bounded by flange portions, the walls of the channel space and flange portions being secured and sealed, as by welding, to the corrugation ends and to the plain sheet, or shell, along the edges of the flange portions to direct and maintain a flow of the fluid between the parallel ducts in intimate contact with the shell.

In one specific form this interconnecting channel-forming means comprises flat box-like structures that fit within the space and are welded to the plain sheet and to the corrugation ends to provide a passage for the temperature modifying medium. The box-like structures have preferably the same depth, substantially, as the corrugations, so that a uniform layer of insulation may be employed. It may also completely fill the intervening space or not, according to the design adopted.

In another form of the invention, wherein the passageways do completely fill up the intervening space, these passageways, or low box-like structures, consist of diagonal channel members which interconnect the ends of the corrugations on one side of the space with the offset ends of the corrugations on the other side. The series is ordinarily started by closing off certain of the corrugations and then using the diagonal channel members to bridge the space between the offset unobstructed ends of the remaining corrugations of the series. Thus, in the case of a series composed of individual corrugations, one end of the first corrugation is closed, a diagonal member connects the delivery end of the first corrugation with the receiving end of the second, a second diagonal member connects the delivering end of the second corrugation to the receiving end of the third, and so on throughout the series; and finally, the last corrugation of the series is closed at its unconnected end. In the case of double corrugations, the same arrangement is followed, but two corrugations replace the one of the single series. The diagonal members are preferably given an over-all dimension in a direction perpendicular to the plain plate, substantially equal to that of the corrugations, although this in certain instances may not be essential. The diagonal arrangement also provides for a series flow of the conditioning medium in contrast to a parallel flow.

In another form of the invention, the interconnections are made by headers, which are also low and box-like, located within the intervening space. By this arrangement, connection is provided for a parallel flow of the conditioning medium, or a reverse flow in series, according to the way in which the headers are divided. Here, again, the headers are rendered low by being given a dimension in a direction perpendicular to the plain sheet which is not materially different from the depth of the corrugations. This is likewise preferable, but not absolutely necessary.

An advantage of the novel arrangement of the parts within the intervening space is found in the fact that with the new arrangement, it is possible to position the terminal pipes outside of the complete wall structure, and to connect them by straight lateral pipes with the ends of the zones. It is also possible to have the terminal pipes extend parallel to the axis of the container within the wall structure. This means that they will extend vertically with a vertical receptacle, and horizontally with a horizontal receptacle. This makes a clean-cut type of receptacle, and one which may have its interior and its exterior polished.

Still other features and advantages of the invention will be more fully understood upon reference to the following taken in connection with the accompanying drawings, and the scope of the invention will be particularly pointed out in the appended claims.

In said drawings,

Fig. 1 is an elevation, partly in central section, of a receptacle or container constructed and arranged according to the present invention;

Fig. 2 is a horizontal section through a portion of the wall, the plane of section being indicated by the line 2—2 of Fig. 1;

Fig. 3 is a vertical section showing the trough in the bottom of the container, the plane of section being indicated by the line 3—3 of Fig. 1;

Figures 36, 37, 38, 39:
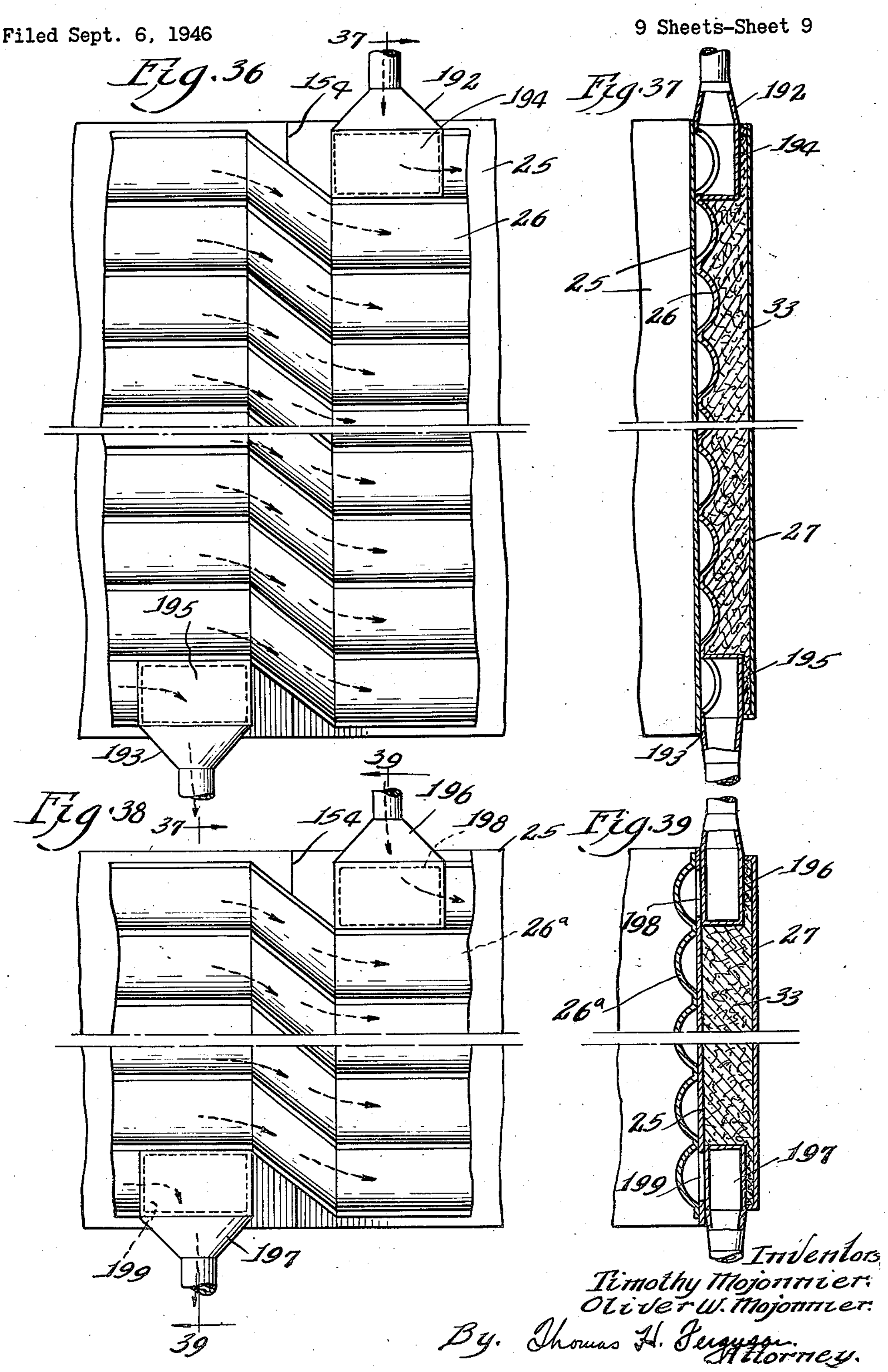
Fig. 36 is a vertical elevation of a still further modification, suited to a single heating zone, which permits both inlet and outlet to be contained within the receptacle outer wall.

Fig. 37 is a vertical section of this still further modification, the section being indicated by the line 37—37 of Fig. 36; and Figs. 38 and 39 are views similar to Figs. 36 and 37 respectively, but showing the corrugations on the inside of the receptacle, a feature which may be employed in the several illustrated forms of the invention, the plane of section of Fig. 39 being indicated by the line 39—39 of Fig. 38.

Throughout these views, like characters refer to like parts.

Referring to the drawings in detail, and at first to the diagonal arrangement illustrated particularly in the early figures of the drawings, it will be observed that the wall structure comprises an inner peripheral wall 25 formed about a central axis, a corrugated wall 26 and an outer wall 27. A lower end or bottom 28 is secured at its outer edge to the inner wall 25. All of these walls are composed of sheet metal and hence, when united, they form the sheet metal shell of the receptacle. In this instance, the bottom 28 is provided with a downwardly inclined trough 29, terminating in an outlet 30, controlled by a suitable valve 31. The outer wall 27 is connected at its lower end by a transverse bottom 32. The wall 27 and bottom 32, when thus connected, constitute an outer sheet metal shell. Within the space between the outer and inner shells, is a suitable heat insulation 33, which may be cork or other like heat insulating material. Projecting downward from the bottom 32, are feet 34, preferably four in number, which serve to support the container on the floor 35. The upper bridge 36, covers 37, 37, motor 38, and agitator shaft 39, may preferably be such as shown in our prior Patent No. 2,280,529, granted April 21, 1942, and therefore need not be further described. The agitator shaft 39 has a bearing 40 located within the trough 29. Projecting from the opposite sides of the lower end of the shaft 39, are the agitator blades 41, 41, which revolve near the inner bottom 28. This is a vertical receptacle. A horizontal one would necessarily have the feet differently located, with a corresponding change in other parts, as suggested by the prior patent of Timothy Mojonnier, No. 2,230,531, granted June 1, 1943.

Continuing now with the description of the more novel features, we may take up the path of the temperature conditioning medium, which path is shown by arrows in several figures. It should be noted, first of all, that the corrugated sheet 26 is secured to the plain sheet 25 by welding it thereto along its valleys. Being a regular corrugated sheet, this welding brings the ends of each corrugation directly opposite each other, and the size of the plain sheet 25 being somewhat longer than the sheet 26, leaves the corrugation ends on opposite sides of an intervening space. Thus, the corrugations lie in parallel planes which extend transversely of the axis of the container or receptacle. In this intervening space, are located the diagonal channel members 42, 43, 44, 45, in the order portrayed in Fig. 4. As there shown, the end of the first corrugation (counting from the top) is closed at the right by triangular shaped member 42. The ends of the fourth and eighth are closed at the right by triangular shaped members 45; and similarly, the ends of the third, seventh and eleventh corrugations are closed at the left by similar members 44. Between these extreme members for each zone, are a number of rhomboid-shaped members 43 by which the ends of the corrugations, which are offset with reference to each other, are connected; thus, the delivering end of the first corrugation is connected with the receiving end of the second, the delivering end of the second with the receiving end of the third, and so on, throughout each zone. In the example presented, there are three zones, three coils in the first zone and four coils in the second and third zones, eleven coils in all. The triangular members 42, 44 and 45 are given a size approximating one half of the rhomboid members 43.

Figure 12:
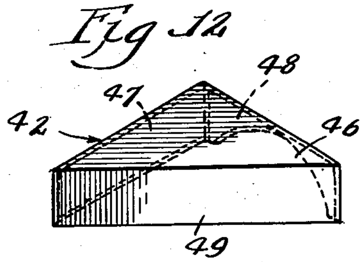
Fig. 12 is a perspective view of the upper end member of the first series used in the diagonal arrangement, the web being shown uppermost.
Figure 13:
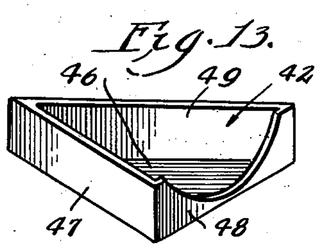
Fig. 13 is a similar view of the same member with the web shown lowermost and the flanges extending upward.
Figure 14:
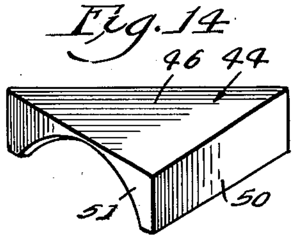
Fig. 14 is a perspective view of an intermediate member, such as is used at the lower end of the first series in the diagonal arrangement, the web being shown uppermost.
Figure 15:
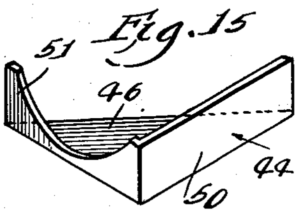
Fig. 15 is a similar view of the same intermediate member with the web shown lowermost and the flanges extending upward.
Figure 16:
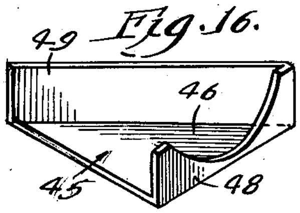
Fig. 16 is a similar view of another member used in the diagonal arrangement.

The triangular members are illustrated particularly in Figs. 12 to 16 inclusive. In Figs. 12 and 13, which illustrate the member 42, there is a triangular web 46, two flanges 47, 48, and a third flange 49, which serves as the hypothenuse of a right angle triangle. The flange 48 has a width approximately equal to the height of a corrugation. It is cut away to fit against the outer surface of the corrugation in position to be welded thereto. The triangular member 44, shown in Figs. 14 and 15, comprises a similar web 46 and two flanges 50 and 51 meeting at right angles to each other. The flange 51 is shaped the same as the flange 48 of member 42, so as to fit against the corrugation. The third or hypothenuse side is devoid of a flange, as one is not necessary the way the parts fit together. The member 45, shown in Fig. 16, is the same as the member 42 of Fig. 13, but has the flange 47 of that figure omitted. As the parts are fitted together, the flange is unnecessary. The interconnecting member 43, of which there are several, is shown particularly in Figs. 7 and 8. It comprises a main web 52, one longitudinal flange 53, and two end flanges 54, 55, which are cut away to fit against the outside of the corrugation.

Figures 4, 5, 6, 7, 8:
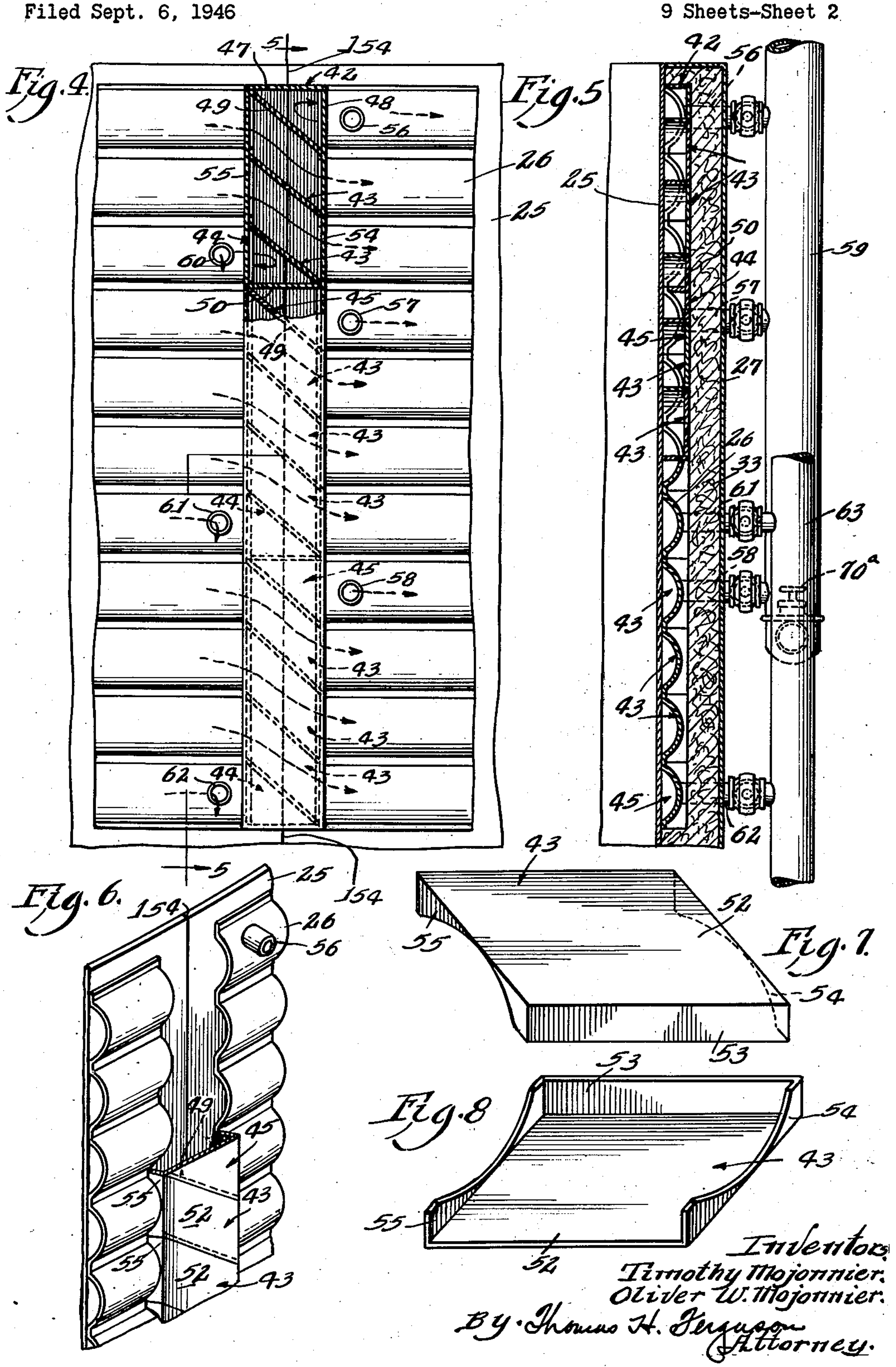
Fig. 4 is an elevation of a portion of the wall structure with a series arrangement of interconnecting passageways provided by individual diagonal channel members within the intervening space.
Fig. 5 is a vertical sectional elevation taken through the receptacle wall, parts being broken away for clearness, and the plane of section being indicated by the line 5—5 of Fig. 4.
Fig. 6 is a broken perspective view of a portion of the diagonal arrangement of interconnecting passageways.
Fig. 7 is also a perspective view of one of the diagonal members used in the series arrangement, the web of the member being uppermost.
Fig. 8 is a similar perspective view of the same with the parts reversed, the flanges being uppermost.

The several diagonal channel members are positioned as shown in Fig. 4, and when so positioned, are welded together. The webs of the several cross-connecting members are spaced from the plain sheet 25, a distance not appreciably exceeding the depth of the corrugations. They then provide the several passages for the three-zoned container indicated by the several arrows. Thus, the series of interconnecting members, which connect, not directly opposite corrugation ends, but the offset ends, constitute conducting means welded to the inner peripheral wall and the corrugation ends and form passages for the flow of the temperature conditioning medium for the several zones. It should also be noted that this conducting means does not project appreciably beyond the corrugations; in other words, it had a depth about the same as the corrugations. Thus, there is provided a wall structure having a substantially uniform thickness for the temperature conditioning portion, and a substantially uniform thickness of covering insulation.

Now, when it comes to providing these coils with supply and discharge connections, we preferably employ lateral end pipes which, starting from the end coil of the zone, project radially outward through the covering insulation 33 and the outer wall 27 into connection with vertical pipes which are located wholly without the outer wall of the container. Then, in the present embodiment, the lateral end pipes 56, 57, 58, are connected to a vertical pipe 59 and three lateral end pipes 60, 61, 62, are connected to a vertical pipe 63.

When the receptacle is used as a pasteurizer, it will have the fluid paths indicated by the arrows of Figs. 1 and 4, and the pipe 59 will constitute the supply pipe, and the pipe 63 the drain pipe for carrying off the condensate. The connection of the supply pipe 59, by which water or steam may be supplied, are shown by a transverse pipe 65 connected in turn through a T-connection 66 with a water supply pipe 67, controlled by a valve 68, and with a steam supply pipe 69 controlled by a valve 70. Either valve may be closed and the other open, the one when heating, and the other when cooling with water. These constitute the supply connections when the receptacle is used as a pasteurizer. A valve 71 closes the lower end of the pipe 59 when the receptacle is so used. At such time the drain-off takes place through pipe 63, a T-connection $66^a$, and a waste pipe $69^a$ controlled by a valve $70^a$. An ammonia pipe $67^a$ controlled by a valve $68^a$ is used, as will be pointed out later, for supplying a refrigerant to the system. When ready for the drain-off, the valve $68^a$ is closed, and the valve $70^a$ is open. Hence, the condensate flows away through the waste pipe $69^a$.

Thus, for the requisite time, steam is supplied to coils and the condensate passes off. This is continued for a half hour with milk, which is the usual substance pasteurized. Then the cooling water is turned on and the steam cutoff. This is continued until the pasteurizer contents are sufficiently cooled.

If the batch is small, the uppermost zone may be cut off and the middle and lowermost used, or again the lowermost zone alone may be used. This is accomplished by means of a series of valves 56a, 57a, 58a, in the lateral pipes 56, 57, 58, respectively. At this time the corresponding valves 60a, 61a, 62a, are left open; the waste valve 70a is also open.

Thus, with the container used as a pasteurizer, the valves 60a, 61a, 62a and 70a perform no useful function. The pipe 63 may as well be left open to atmosphere at its outlet end. These valves will be used as otherwise pointed out hereinafter.

Figures 9, 10:
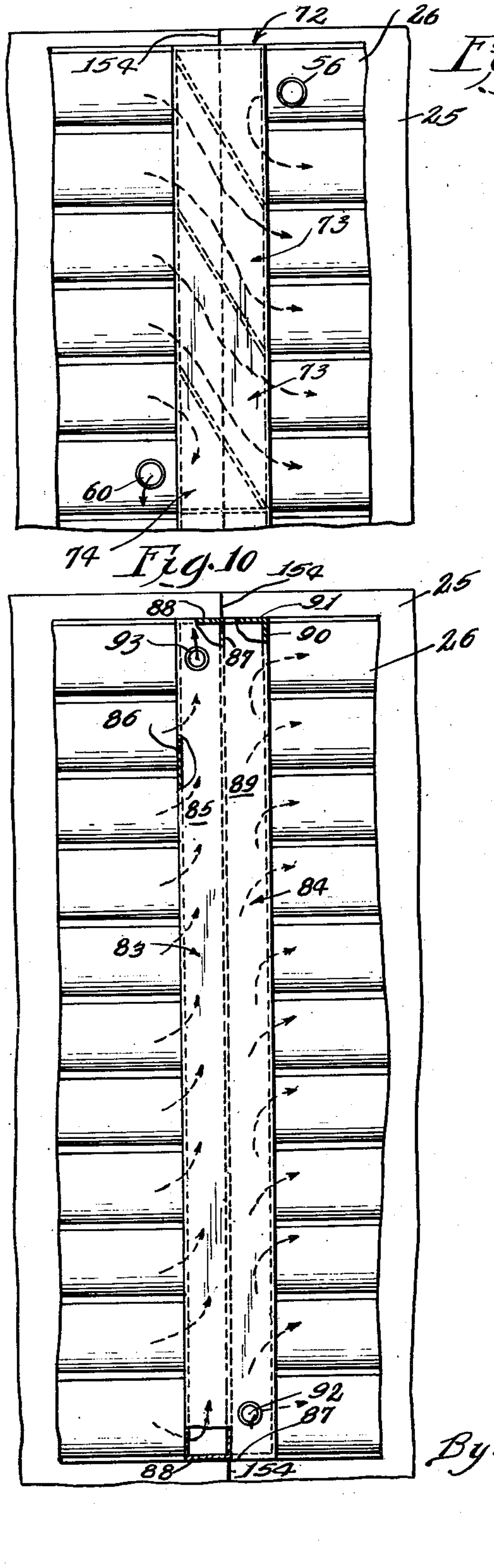
Fig. 9 is a fragmentary elevational view of a modification of the diagonal arrangement, the arrangement providing for connecting pairs of corrugations instead of individual corrugations, as shown in the previous figures.
Fig. 10 is an elevation of another form of the invention, showing two straight-line headers and connections for a parallel flow between said headers.
Figure 17:
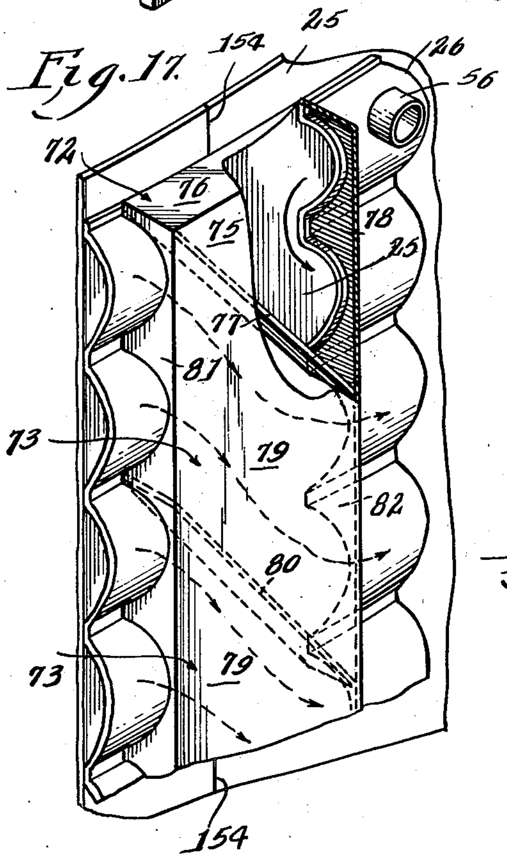
Fig. 17 is a perspective view of a portion of the wall structure showing the double corrugation arrangement of Fig. 9.

Now we come to a modification, according to which the cross-connected channels include two corrugations for each cross-connecting member. Such an arrangement is shown in Figs. 9 and 17. Obviously, the number of included corrugations may be varied. In Fig. 9, a single zone of six corrugations is illustrated, and the cross-connecting members include two for each crossing. The construction is similar to that heretofore described. Thus, the corrugated sheet 26 is affixed to the plain sheet 25 by welding it thereto along the valleys of the corrugations. The six corrugations shown terminate at opposite sides of an intervening space in which are located the triangular member 72, the interconnecting cross-channel members 73, 73, and the lower end member 74. These members 72, 73 and 74 are similar to the members 42, 43, 44, 45, but have slightly different dimensions, trim and shape to suit the double arrangement. Thus, the upper end member 72 has a web 75 and two flanges 76, 77, which are uncut; and a third flange 78, which is trimmed away to fit two corrugations instead of a single one, as in the first form of the invention. The members 73 are each provided with a web 79, a lower uncut diagonal flange 80, and side or end flanges 81, 82, which are cut away in scallops, each to fit upon two corrugations. When the bottom is reached, the triangular member 74 (shown in Fig. 9) is suited to fill out the series. It is similar to the member 44, but has different dimensions, as indicated in the drawings. It also has a flange trimmed out to fit two corrugations. Similar lateral pipes 59 and 60 are provided for connecting with the terminal pipes, as heretofore. This may be taken as the uppermost zone of several zones just as indicated in Fig. 1. It is a fragmentary view. The other zones come below it, as will be obvious.

Taking up now the straight-line header construction, which is utilized to fill in the intervening space between the corrugation ends in the manner heretofore done by the diagonal members, we have the same plain sheet 25 with the corrugated sheet 26 connected thereto along the valleys of the latter. This form, with a straight parallel connection between the headers, is illustrated in Figs. 10 and 18.

Ordinarily, such an arrangement is used in refrigeration work where a quick flow of ammonia, or like cold producing substance, is employed. Thus, in the case illustrated, ammonia is quickly flowed into one header and then passes through the corrugations in parallel, the same being a relatively short path, and then, as it takes up heat from the substance to be refrigerated, the liquid ammonia becomes a gas which is collected in the second header and passes back to the compressor to be liquified again and the cycle repeated. It should also be kept in mind that when a path is chosen for ammonia, it should be kept for that purpose.

Figure 11:
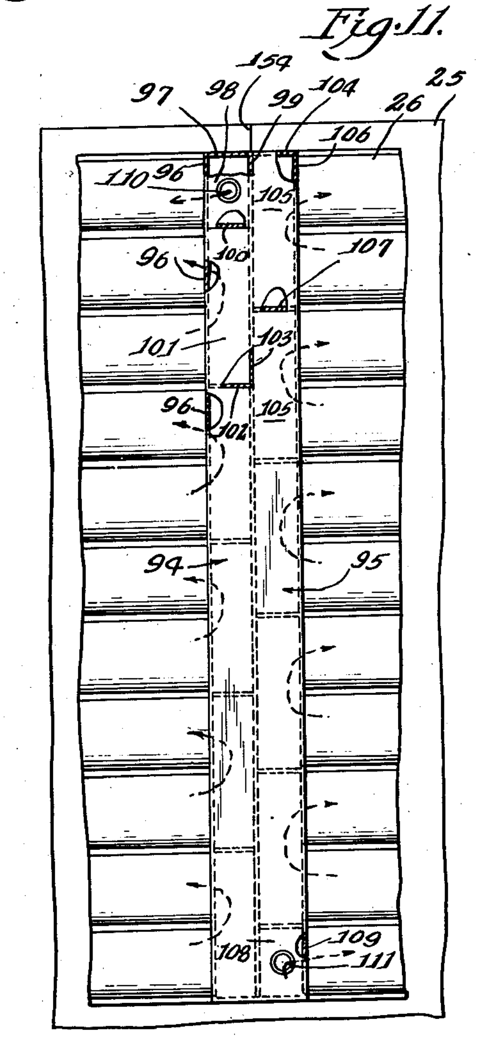
Fig. 11 is a similar elevation showing a form having a reversed series flow.
Figures 18, 19:
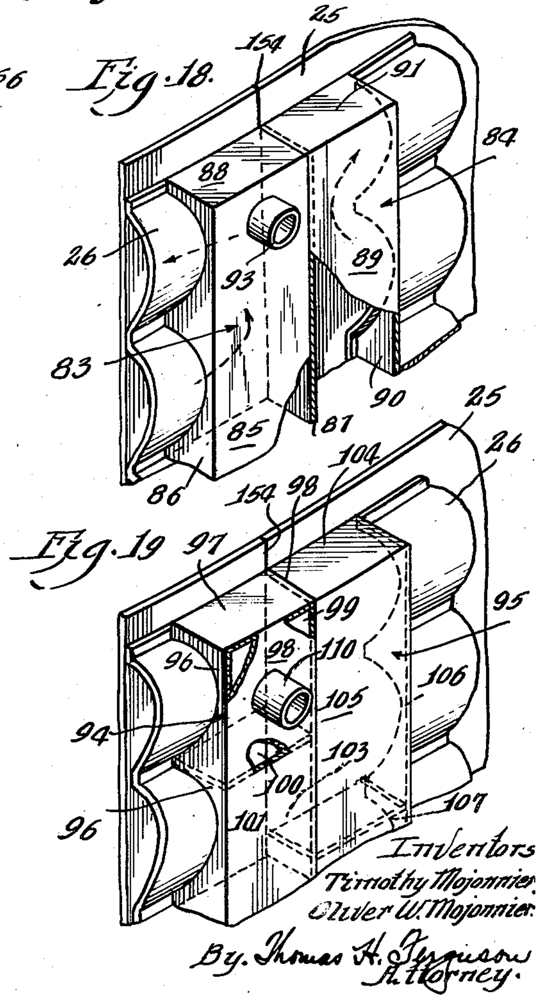
Fig. 18 is a similar view, showing the two straight line header arrangement of Fig. 10.
Fig. 19 is a similar view, showing the reverse flow arrangement of Fig. 11.

It will be noted that with this straight-line header construction, the intervening space is filled up with the two headers 83, 84, which are box-like in form and are rendered flat by keeping down their dimension at right angles to the sheet 25 to approximately that of the corrugations. The header 83 comprises an outer web 85, preferably two side flanges 86 and 87, and closed ends 88. The flange 86 is cut with indulations which form scallops to fit against the exteriors of the several corrugations. Then the box-like header is placed upon the plate 25 and corrugations of the corrugated plate 26 and welded in place. Thus, the header 83 is positioned. Then the angular member, which makes up the other header 84, is taken in hand. Its web 89 is placed in line with the web 85 of the header 83, which web, as in the case of the prior interconnections, is spaced from the peripheral wall 25 a distance not appreciably exceeding the depth of the corrugations, and is fitted up against the header 83 in position to be welded thereto. Its other flange 90 is shaped so as to fit the corrugations of the corrugated sheet 26. When thus fitted, and when supplied with closing ends 91, the whole is welded along the plate 25, where it touches that plate, along the corrugations where it engages them, and to the other header 83 where it contacts it. So, both headers 83 and 84 stand side by side. Obviously, the header construction might be reversed. Thus the header 84 might be a channel, and the other header 83 angular, or both might be composed of angles, although such construction would be more expensive with no accruing advantages. Suitable connecting lateral pipes 92, 93, may be employed. These, as before pointed out, would connect with the supply pipes located beyond the limits of the outer peripheral wall of the receptacle. This will be understood without further description or illustration.

Where a long series connection is desired with straight-line headers, an arrangement such as shown in Figs. 11 and 19 may be employed. There the corrugated plate 26 is welded to the plane plate 25, the same as in the other figures. In the space between the opposing ends of the corrugations, the headers 94, 95, are located. These are straight-line headers just as the headers 83, 84, but are differently constructed so as to make it possible to weld the various constituent parts in place.

This welding job may be done in different ways. The way followed out in this description is merely one example. Other efficient ways may suggest themselves to welders.

Starting with the top and working down, we first put in place a long flange strip 96, which extends the entire length of the zone. It is cut away to fit the several corrugations. This strip is welded in place with its scalloped edge engaging the undulations of the plate 26. It has a width substantially equal to the depth of the corrugations. The strip 96 may be made integral with the end 97 of the header 94, or the end 97 may be placed separately by welding it to the plate 26 along one edge, and to the flange 96 along its edge adjacent thereto. Then the first or uppermost member of the header 94 may be considered. It has a web 98 and flanges 99 and 100. It is secured in place by welding along the two edges of its web 98, that is, the edges which engage the strip 96 and the end piece 97, then along the lower edge of flange 99 which engages the plate 25, and finally along the lower edge of flange 100 where it contacts the plate 25. Thus, the first member of the header 94 is welded in place. Next, we take up the member having the web 101 which is twice the length of the member just described. It has two flanges 102, 103, and is otherwise similar to the member above it. It is placed upon the plate 25 and up against the flanges 100 and 96 in the same way and there welded in place, the one edge of the web 101 being welded to the flange 96, and the adjacent edge being welded to the transverse flange 100, and then finally the edges of the flanges 102, 103 being welded to the plate 25. Thus this second member finds its place in the welded assembly. Each of the remaining members, which are likewise provided with webs and flanges, are similarly placed and welded. The uppermost member, being about one-half the length of the remaining members, cares for one corrugation. The remaining care for two each. Thus, the first header 94 is completed.

Turning now to the other header, the header 95, we first place the end 104 at the end of the header, by suitably welding it to an adjacent member, as edgewise to the plate 25. The first member, which fits against the end 104, is similar to the long members of the headers 94 (those having the webs 101). It comprises a web 105 and two flanges 106 and 107, which meet at right angles to each other. The flange 106 is cut with an undulating edge so as to fit against two corrugations. When in place, it is welded to the two uppermost corrugations. The web 105 is welded to the header end 104, and the two flanges 99 and 103, which it overlaps. The flange 107 is welded to the flange 103 and main plate 25. Following this first member, are other like members also having a web 105 and flanges 106, 107, which are similarly welded in place. At the lower end, is a member having a web 108, which is one-half the length of the long members of the series. Consequently, its flange 109 is cut to fit only one corrugation, as will be obvious.

The two headers 94, 95, are provided with horizontal end pipes 110, 111, which, when the structure of Fig. 11 is covered with insulation and an outside peripheral wall, pierces both said insulation and outer wall and is connected to terminal pipes, as explained in connection with the previous figures.

With the arrangement shown, there is a reversal of flow in each of the long members, and a flow in a single direction at the end where the medium enters or leaves the pipe 110 or 111. Thus, a long series flow is provided by this arrangement.

Figures 20, 21, 22:
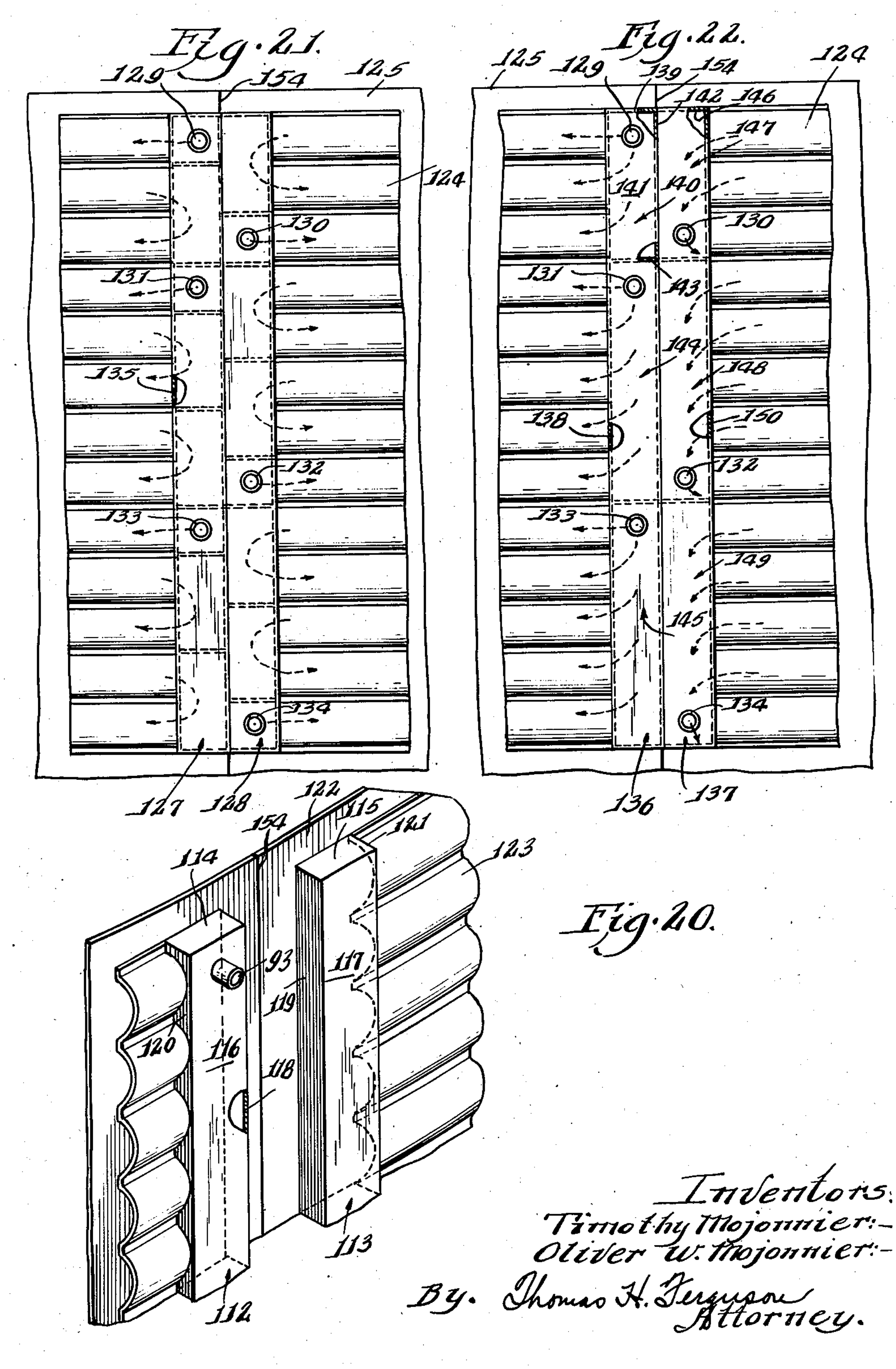
Fig. 20 is a similar view, showing the straight line arrangement wherein the space between the corrugation ends is wider and not completely filled by the headers as in earlier figures.
Fig. 21 is an elevation illustrating a reverse series flow of the temperature conditioning medium with straight line headers and providing the same number of zones as the diagonal arrangement of Fig. 1.
Fig. 22 is a similar elevation illustrating a parallel flow of the temperature conditioning medium with straight line headers and providing also a series of zones.

In Fig. 20, we show a form of the invention similar to that shown in Fig. 18, but the space in which the headers are located is much wider. In such case, the space is sufficient to allow the welding of the complete headers 112, 113, upon all sides. These headers comprise closed ends 114, 115, webs 116, 117, contiguous flanges 118, 119, and remote flanges 120, 121. The remote flanges are scalloped to fit the corrugations. With this arrangement, each header can be welded to the base plate 122, and the corrugations of the corrugated plate 123. Connections are made as before by the pipes 92, 93.

This same structure with a wide intervening space may be used with the conduit arrangements of Figs. 10, 11, 18, 19, 21 and 22, as will be apparent to workers in this art. Indeed, the intervening space may extend throughout a wide range, varied to suit requirements. Indeed, it may cover a wide section of the receptacle and a small section may be devoted to the jacket.

In Fig. 21, a straight-line header arrangement, to perform the same functions as the diagonal arrangement of Figs. 1 and 4, is shown. In this arrangement, there are thirteen parallel corrugations provided in the corrugated plate 124, welded to the plane plate 125. The two plates 124 and 125 are welded together in the same way as before. There are two straight-line headers 127, 128, made up in somewhat the same way as the headers 94, 95, of Fig. 11. There are three zones, the uppermost comprising three corrugations, the middle one five corrugations, and the lowermost also five corrugations. To these headers 127, 128, are secured zonal end pipes 129, 130, for the uppermost zone; pipes 131, 132 for the middle zone; and pipes 133, 134 for the lowermost zone. The flow of the temperature conditioning medium when the container is used as a pasteurizer is in the direction shown by the arrows. The three end pipes 129, 131, 133, are connected to the header 127; and the other three pipes 130, 132, 134, to the other header 128.

The headers may be variously pieced together by the person welding the same. The way herein proposed is merely illustrative. Beginning with the header 127, we may start with a longitudinal strip 135, having substantially the same depth as the corrugations. It will be cut and welded in a manner similar to the way in which the corresponding strip 96 of the embodiment shown in Fig. 11 was formed and placed. Then the upper end member of the header 127 will be placed and welded the same as the upper end member of the header 94 of Fig. 11. Similarly, the second member of the header 127 will be placed and welded in position, the same as the second member of Fig. 11. This completes the placing of the members for the portion of the header 127 assigned to the first zone. The members of the corresponding portion of the header 128 are similarly formed and welded the same as the corresponding members of Fig. 11. This completes the portion of the header 128 assigned to the first zone. The trimming and welding of the balance of the members which go to make up the headers 127, 128, for the other two zones, will be the same as the corresponding members of Fig. 11, the main different being that there are three short members for each header and five long members. The three short members of header 127 carry the end pipes 129, 131, 133, and the three short members of header 128 carry the end pipes 130, 132, 134, one pair for each zone, thus 129, 130 for zone one, 131, 132 for zone two, and 133, 134 for zone three.

Thus, in the particular embodiment illustrated, the entire number of corrugations, thirteen in all, is divided into three zonal sections separated by partitions, the uppermost consisting of three corrugations, and the other two of five each. It will be noted, also, that the outer web of these headers does not appreciably exceed the depth of the corrugations.

With this arrangement, all three zones may be supplied with a temperature conditioning medium. Assuming that the container is to be used as a pasteurizer, then steam may be supplied to the lateral end pipes 129, 131, 133, of the zones through suitable terminal connections, and the condensate may be drawn off through the pipe 63;

or when cooling, cooling water may be similarly supplied by proper manipulation of the control valves 68, 70, of the supply source. The surplus water will be carried off through the end pipes 130, 132, 134, and the terminal pipe 63. All of this will be obvious to a worker in this art, and an inspection of Fig. 1.

In Fig. 22, we show a similar straight-line header arrangement with parallel connections for delivering all the heating or cooling medium for any given zone directly from one header to the other, through all the coils, furnished by the corrugations, in parallel. It is the same as the arrangement of Fig. 21 except that it has a different header construction. Thus, the plates 124 and 125 are the same. There is also the same arrangement of zones. The end pipes of the zones are also similarly arranged, the pipes 129, 130 being associated with the upper zone, the pipes 131, 132 being associated with the intermediate zone, and the end pipes 133, 134 with the lowermost zone.

The headers 136, 137, are pieced together similarly to the other headers. Again, the scheme proposed for the particular welding of the headers is merely illustrative. Beginning with the header 136, it will be noted that the left-hand strip 138, having substantially the same width as the depth of the corrugations, is trimmed to fit upon the corrugations and is then welded in place. Then the left-hand end 139 is secured in place as before. Then the first left-hand member 140 is put in place and welded. It is an angular member having a web 141 and two flanges 142, 143. Then similar members 144, 145, are placed along the flange 138 and welded as before. Thus the left-hand header 136 is completed.

Turning now to the right-hand header 137, it will be noted that it is similarly fitted and welded. It comprises an upper end 146, and members 147, 148, 149, which are similar to the other members and similarly welded. It will be noted that right-hand flanges, of which one only, designated 150, is shown, are scalloped to fit against the corrugations upon which they are welded in completing the header structure.

The pipes 129, 131, 133, are connected to the upper ends of the header sections 140, 144, 145, respectively. Likewise, the pipes 130, 132, 134, are connected to the lower ends of the corresponding header sections.

With this arrangement, all three zones may be supplied with the temperature conditioning medium, or only one or two zones, as before explained in connection with the arrangement of Fig. 21. Likewise, assuming that the container is to be used as a pasteurizer, then steam may be supplied to the lateral end pipes 129, 131, 133, of the zones through suitable terminal connections, and the condensate may be drawn off through the pipe 63 (referring again to Fig. 1) or when cooling, cooling water may be similarly supplied by proper manipulation of the control valves 68, 70, of the supply source. The surplus water will be carried off through the end pipes 130, 132, 134, and the terminal pipe 63. All of this will be obvious to a worker in this art.

At this point, it may be well to state that the different constructions, the diagonal and the straight line, may be changed over for cooling with ammonia and the like. As is well known, ammonia, in its cycle of refrigeration, passes through the liquid phase and the gas phase. As a liquid it takes up heat (of the refrigerated substance) and becomes a gas. It is then again compressed into a liquid. It is, therefore, desirable to have many zones admitting the liquid at the bottom and passing out the gas at the top.

Thus, in the diagonal arrangement of Figs. 1 and 5, for example, the liquid ammonia would be admitted to the end pipes 62, 61, 60, controlled by valves $62^a$, $61^a$, $60^a$, respectively, and the gas taken off at the end pipes 58, 57, 56, respectively. Likewise, in the straight-line header arrangement of Figs. 21 and 22, the liquid ammonia would be admitted to the end pipes 134, 132, 130, and the gas taken off at the end pipes 133, 131, 129, respectively. Likewise, the streams could pass in parallel in the arrangement of Fig. 10 by using that arrangement and making the zones sufficiently short, that is, of a few coils. Obviously, when ammonia or its equivalent is used with all the coils, then the water and steam supply valves 68, 70, and the valve $70^a$, would be closed and remain so, and ammonia control valves $68^a$ and 71 would be opened. If one zone would suffice to do the work of refrigeration, then the control valves $60^a$, $61^a$, and preferably the valves $56^a$, $57^a$, would be closed; if two zones were required, then valve $60^a$, and preferably valve $56^a$, would be closed. The pipe $69^a$ would lead to the ammonia compressor (not shown).

Coming now to the novel way of making up the composite sheet, it may be pointed out that a preformed sheet is welded to the face of a plain sheet. The preforming may take various shapes. In the preferred structure, it comprises definite bulges and depressions. The bulges may be surrounded by the depressions, or otherwise, as desired. When the bulges are continuous from end to end and separated by continuous depressions, the preformed sheet becomes a corrugated sheet. The corrugated sheet is caused to adhere to the plain sheet, preferably by welding, although soldering, brazing and other ways will suggest themselves to workers in the art. Such welding occurs along the valleys of the corrugated sheet. Such a sheet is shown in Figs. 23 and 24.

Figures 23, 24, 25, 26:
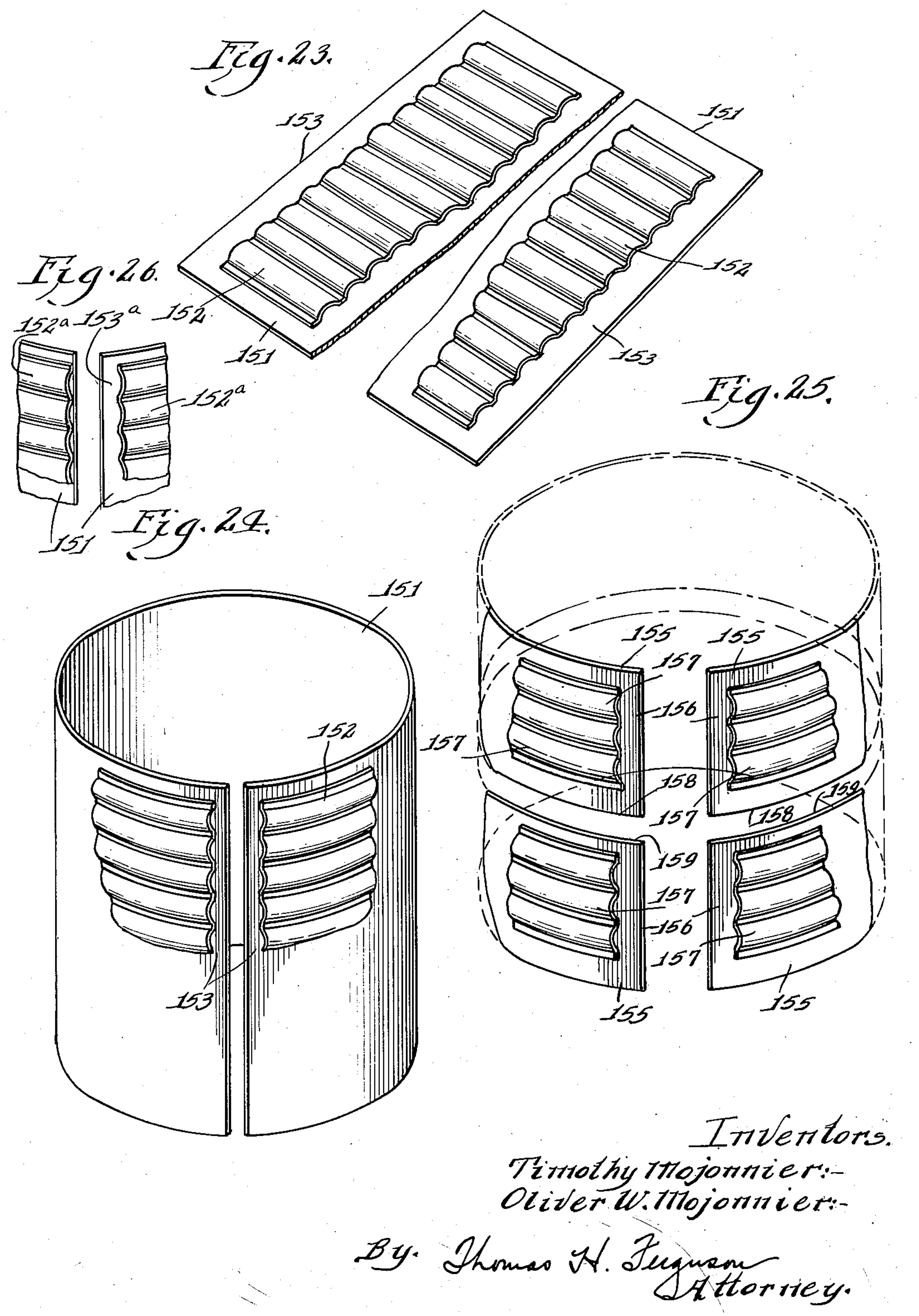
Figs. 23 and 24 are perspective views which show the way in which the constituent sheets are assembled and bent to form the composite wall.
Fig. 25 is a perspective view showing how the entire wall of the container may be made up of sections, and the sections may be then welded together.
Fig. 26 is a view illustrating a modification of the construction of Figs. 24 and 25 wherein the projection of the plain sheet beyond the corrugated sheet is all at one end.

In Fig. 23, the plain flat sheet 151 serves as the base; it is made somewhat longer than the corrugated sheet 152, which allows the corrugations to end a short distance from the ends of the base plate. This distance may be varied, as has been pointed out heretofore. The corrugated sheet 152 is then welded to the plain sheet 151. This is done by tack welding or spot welding the corrugated sheet 152 upon the plain sheet to position it; then, while both are still flat (except, of course, for the corrugations) using an electric seam welder or the like to weld the corrugated sheet 152 to the plain sheet 151 along the valleys between the corrugations. Then the composite sheet, made up of the two sheets, the corrugated sheet welded to the plain sheet, is bent by a suitable means the hard way, that is, crosswise of its corrugations, until its ends 153, 153, closely approach each other. This is illustrated in Fig. 24. Then the ends are brought together and welded into a uniting seam 154, so designated in all of the figures of the drawings where it occurs. Within the space left between the ends of the corrugations, the connecting means, such as the diagonal members or the straight-line headers previously described, is located.

When the composite sheet is too large to be readily bent, then the same may consist of sections 155, composed of base plates 156, and corrugated top plates 157, suitably secured thereto by welding in the manner before explained. Thus, each section may be separately bent and its edges 156, 156, welded together to form a ring with the axis of rotation surrounded by the corrugations. Then the completed rings may be welded together along meeting edges 158, 159. The construction is indicated in Fig. 25.

In Fig. 26, we have shown the plain sheet 151 with its ends brought into proximity in the same way as in Fig. 24, but in this case the corrugated metal sheet 152a is welded to the plain sheet 151 so as to have its one end flush with the end of the plain sheet. This left the plain sheet with all of the protruding margin 153a at one end. Hence when the composite sheet is bent into its approximate final position, the two plates 151 and 152a at one end, as at the left-hand side in Fig. 26, are flush with each other and far apart at the other end, as at the right-hand side in Fig. 26, leaving the margin 153a. Thus, in this form the interventing space, coming between the ends of the corrugations, is practically all upon the end at the right in Fig. 26. In other words, this intervening space may be all upon one end, or equally upon both ends, or it may be divided between them, as desired.

Figure 27:
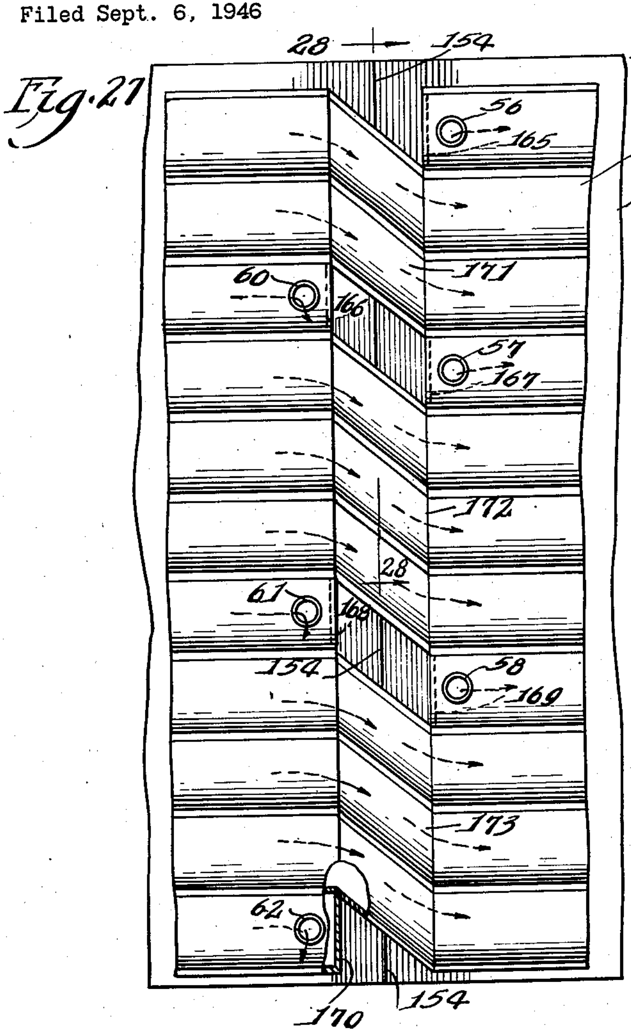
Fig. 27 is a view similar to Fig. 4, illustrating a modification wherein the interconnecting passageways are provided in a single strip and the ends of the corrugations, which are closed, are closed by simple terminal walls.
Figure 28:
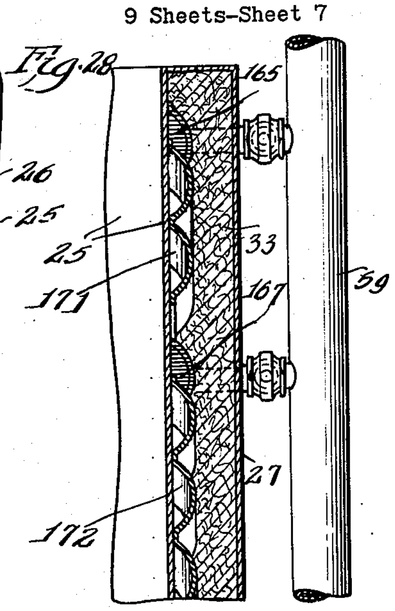
Fig. 28 is a vertical section of the same modification, the plane of section being indicated by the line 28—28 of Fig. 27.

Again, in Fig. 27, we have shown simple plates 165 and 166 closing the ends of the uppermost and lowermost coils of uppermost zone, instead of the triangular members 42 and 44 of Fig. 4. Similar plates 167, 168, close the corresponding ends of the second zone, and plates 169, 170, close the ends of the third or lowermost zone. The corrugations of the plate 26 are arranged upon the plate 25 the same as in Fig. 4, and the inlets 56, 57, 58, are the same and also the outlets 60, 61, 62. This means that the conditioning fluid will flow from the inlet 56 through the corrugations and out at the outlet 60, as indicated by the arrows. The flow from inlet 57 to 61 will be as indicated, likewise the flow from inlet 58 to 62.

The plates 165, 166, 167, 168, 169, 170, which close the open ends of the end corrugations of each zone, are simple plates, preferably made of the same shape as the corrugated passage. They are welded into place to close the ends. They may be variously shaped, however.

The portions of the plain sheet 25, which lie adjacent to the plates 165 and 170, remain uncovered. Likewise, the diagonal portion between the plates 166 and 167 and the similar portion between the plates 168 and 169, remain exposed. This will be clear from the presence of the uniting weld line 154 in each of these spaces.

The diagonally corrugated strips 17, 172, 173, are preferably made by corrugating a sheet in the regular way and then cutting the strips on the bias, as indicated. It will be noted that the width of the corrugations will be slightly less than the width of the corrugations which extend around the shell. Hence they will have a slightly less cross-sectional area, but this will be compensated for by the stream of the conditioning medium which flows through the reduced cross-sectional area at a greater velocity at that point.

Figure 29:
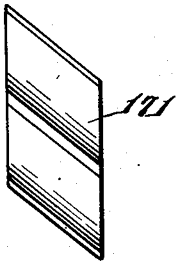
Fig. 29 is an elevational view of a short strip made with diagonal corrugations which occupies the intervening space.
Figure 30:
Fig. 30 is an edge view of the same piece secured to the plain sheet.
Figure 31:
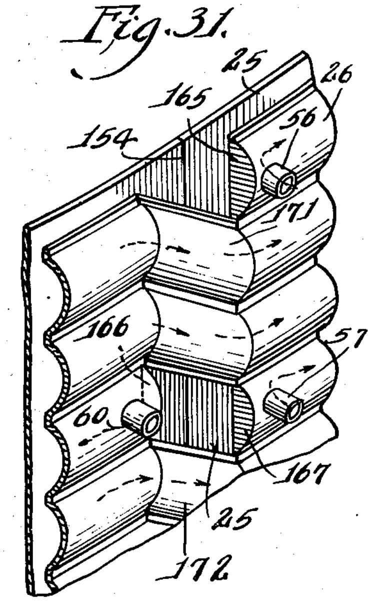
Fig. 31 is a perspective of a portion of this diagonal arrangement of the corrugated strip in the intervening space.

The strip 171, shown in detail in Figs. 29 and 30, has but two corrugation passageways. The strips 172 and 173, on the other hand, have three such passageways. These several strips are positioned within the intervening space between the ends of the main corrugations of the shell, and are welded into place, as will be obvious. Instead of employing three segmental strips, it will be apparent that one or more strips or strip sections may be employed. In such case the end plates 165, 166, 167, 168, 169, 170, may be first welded in place. In other words, a single corrugated strip may be employed extending from the top to the bottom, or throughout any other portion of the length of the intervening space. This has not been illustrated, but is obvious.

Figures 32, 33, 34, 35:
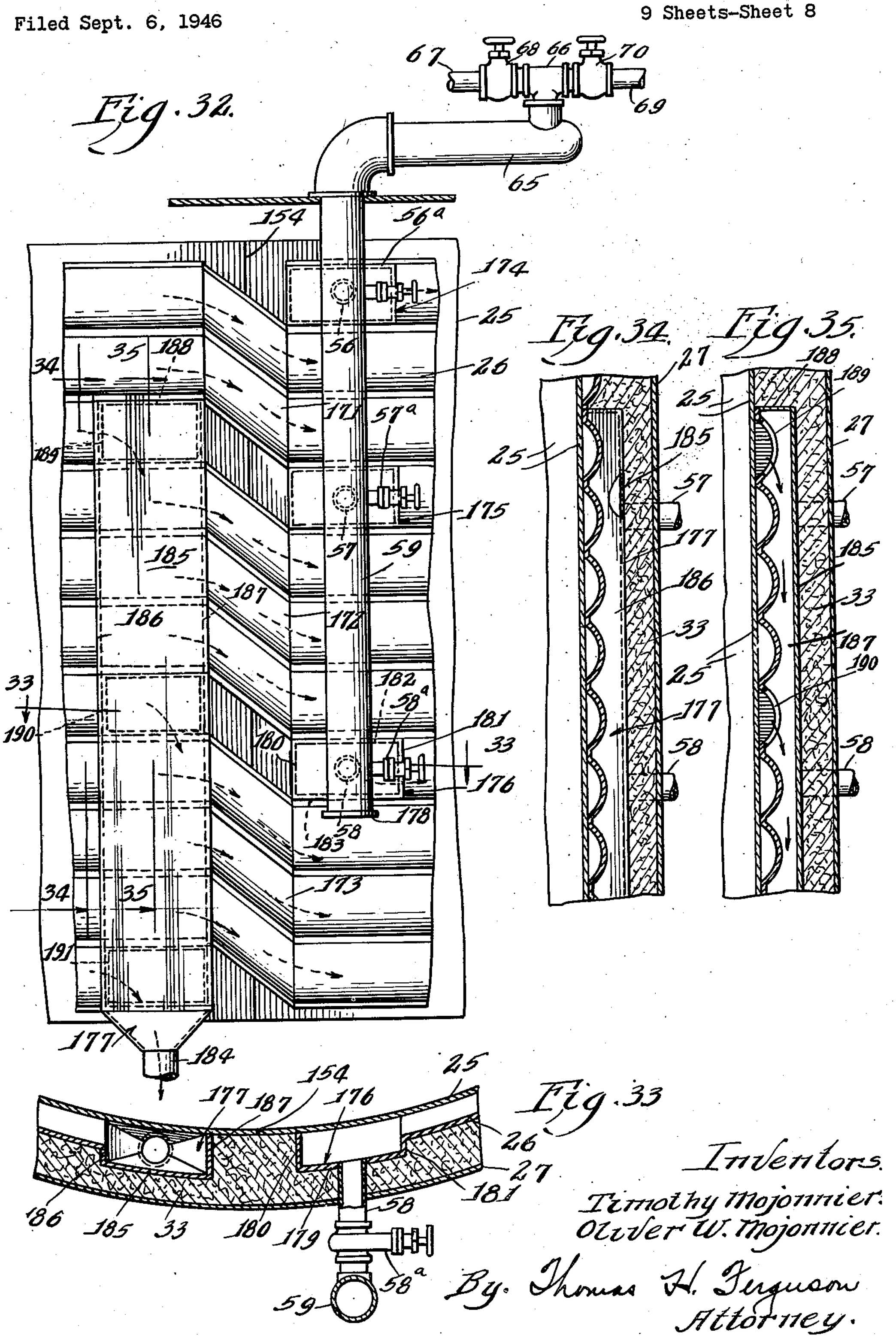
Fig. 32 is an elevational view of a modification of the structure of Fig. 1, when used only with a heating medium, showing among other things the outlet wholly within the wall structure.
Fig. 33 is a horizontal section through a portion of this modification, the plane of section being indicated by the line 33—33 of Fig. 32.
Fig. 34 is a vertical section through the same modification, taken on the line 34—34 of Fig 32.
Fig. 35 is a similar section taken on the lines 35—35 of Fig. 32.

In Fig. 32, we have shown the same arrangement of inlet pipe 59 and connections as in Fig. 1, but here the inlet laterals 56, 57, 58, extend into inlet boxes 174, 175, 176, respectively. These inlet boxes perform the function of the stop plates 165, 167, 169, of the form of the invention shown in Fig. 27. The principal departure is in the construction of the outlet passage 177. It will be remembered that with this arrangement (Fig. 32), the structure is to be used as a pasteurizer. Hence the flow of the medium remains the same as indicated by the dotted arrows in Fig. 1, and by the dotted line arrows of Fig. 32. The intervening space between the ends of corrugations of the main corrugated plate 26 is filled in with the interconnecting strips 171, 172, 173, just as in the last modification (Fig. 27). The lower end of the inlet pipe 59 is here closed by a cap 178.

The boxes 174, 175, 176, are the same in each instance. The main corrugation with which it is associated is cut away a distance equal to the length of the box, as for example the box 176, which may be selected for description. Then the box, which includes an outer web 179, two ends 180, 181, and two sides 182, 183, is welded into place. The end 180 extends completely down into contact with the main shell plate 25, while the end 181 is scalloped or cut away to fit the end of the particular corrugation with which it is associated. The corresponding inlet pipe, 58 in this case, is welded into an opening in the web 179. The end 180 constitutes a closure of the main corrugation. Hence the only inlet to the corrugation is through this pipe.

Coming now to the single outlet 177, it will be noted that it is wholly within the wall of the receptacle except for the outlet end which extends beyond the bottom and may be variously shaped. Because of its shallowness, the outlet trough is given a considerable width so as to readily conduct away the condensate. At is lower end it is connected to a discharge pipe 184. The outlet 177 is trough-shaped and comprises a web 185, two sides 186, 187, and a closed end 188. The side 186 is scalloped so as to fit the corrugations, to which it is welded. The opposite side 187 is also scalloped to similarly fit against the fourth, fifth and sixth corrugations (numbering from the top), and the eighth, ninth and tenth, leaving the portions corresponding to the third, seventh and eleventh corrugations full width so as to engage the main plate 27. It is welded to the main plate and to the main corrugations. Of course, if a different number of corrugations were used, then there would be a corresponding change in the side scallops of the plate 187. To complete the structure, three windows 189, 190, 191, are cut in the corrugations ends at the left as the parts are viewed in Fig. 32. Through these windows and on down through the trough 177, flows the condensate.

Taking up now the single zone structure of Figs. 36 and 37, it will be noted that both the supply structure and the waste structure are wholly within the wall. Here the corrugated wall 26 is secured to the plain wall 25 as before. But this time, in view of the fact that the design is for a single zone, the inlet and outlet may be both constructed the same as the outlet in the last modification (Fig. 32), except for the length. Thus, the inlet 192 admits the conditioning fluid and the outlet 193 discharges the condensate or residue. The outer walls 194, 195, of the boxes may be located against or a short distance from the outer receptacle wall 27 as may be desired, so the heat insulation 33 may cover it as well as the corrugations and other parts to be heat insulated. The result is that a receptacle may be provided that has a smooth exterior and may be readily polished.

The structure of Figs. 38 and 39 is similar to the one just described (Figs. 36 and 37), but the corrugations are placed on the inside of the receptacle. Thus, the plain sheet 25 and the outside sheet 27 are separated and the intervening space filled with the insulation 33. The terminal boxes 196 and 197 only are located within the space occupied by the insulation. Access is had between the box 196 and the uppermost corrugation through opening 198. Similarly, an opening 199 provides for the flow of the conditioning medium between the box 197 and the associated corrugation. The corrugations are provided by the plate 26ª which is bent oppositely to the plate 26 of the other figures.

Obviously, the shape of the receptacle may be varied. It may be elliptical, square, oblong and the like. It may also be composed of various substances.

Although it has been necessary to exaggerate some of the dimensions, particularly the thickness of the material, it is to be understood that, ordinarily, the principal material will be sheet metal of the stainless variety, having a gauge preferably of 14 or 16, United States Standard Revised. This may be varied in accordance with the judgment of the designer.

It will also be apparent from what has been said that the preformed sheet need not be a corrugated sheet, but may be differently formed.

It will also be understood that the intervening space may vary greatly. Indeed, in certain instances, it may include the greater part of the circumference of the container, the balance being taken up by the jacket. The temperature controlling jacket has openings on opposite sides of the intervening space. In the preferred form, the passages extend around the curved wall of the shell and partially enclose the same, leaving only the intervening space unenclosed by them.

It will be understood that the invention may be variously used for heating or cooling, with water, steam, ammonia, or other heating and refrigerating substances; and the pipes for supplying these substances may be interchangeably used. Thus, the inlet for steam may be changed to an outlet for ammonia and the like. In the case of such reversal, the arrows of some of the figures would have to be reversed, as will be obvious. The dimensions of the various parts may be varied according to the use, as will be obvious.

The form of the receptacle need not be limited to a vertical construction, since the same may be horizontal or inclined, as desired. Likewise, the invention may be used with hot or cold wall tanks, vats or other receptacles. The terms "tanks" and "vats" are used interchangeably. It is understood that in some arts the term "tanks" is used to apply to containers that cool and store only, and "vats" to containers used in processing operations which involve both heating and cooling operations.

Still other alterations and modifications may be made in the particular structures shown and the uses to which the invention may be applied, without departing from the spirit and scope of the invention. Accordingly, we do not wish to be limited to the exact embodiments herein disclosed, but aim to cover by the terms of the appended claims all such alterations and modifications as directly come within the scope of the invention.

We claim:

1. In a receptacle of the class described, the combination of a sheet metal shell, a corrugated sheet metal wall secured and sealed to said shell along its valleys to provide a series of independent parallel ducts for conveying a temperature conditioning fluid in intimate contact with said shell, said corrugations extending around said shell and terminating in opposing open ends located upon opposite sides of an intervening space extending at substantially right angles to the corrugations, means for closing certain of said open ends on opposite sides of said space and at opposite ends of said series, inlet and outlet connections communicating with said closed ducts, and relatively short diagonal channel means secured and sealed along channel edges to said shell and at other points to the remaining offset unobstructed duct ends to interconnect said offset ducts to provide for a diagonal flow of the fluid in intimate heat conducting relation with the receptacle contents.

2. In a receptacle of the class described, the combination of a sheet metal shell, a corrugated sheet metal wall secured and sealed to said shell along its valleys to provide a series of independent parallel ducts for conveying a temperature conditioning fluid in intimate contact with said shell, said corrugations extending around said shell and terminating in opposing open ends located upon opposite sides of an intervening space extending at substantially right angles to the corrugations, means for closing certain of said open ends on opposite sides of said space and at opposite ends of said series, inlet and outlet connections communicating with said closed ducts, and relatively short diagonal channel means having an outer surface substantially flush with the tops of the corrugation ridges, said channel means being secured and sealed along channel edges to said shell and to the remaining offset unobstructed duct ends to interconnect said offset ducts to provide for a diagonal flow of the fluid in intimate heat conducting relation with the receptacle contents.

3. In a receptacle of the class described, the combination of a sheet metal shell, a corrugated sheet metal wall secured and sealed to said shell along its valleys to provide a series of independent parallel ducts for conveying a temperature conditioning fluid in intimate contact with said shell, said corrugations extending around said shell and terminating in opposing open ends located upon opposite sides of an intervening space extending at substantially right angles to the corrugations, means for closing certain of said open ends on opposite sides of said space and at opposite ends of said series, inlet and outlet connections communicating with said closed ducts and a series of independent box-like structures diagonally positioned in said space and each welded to said shell and to unobstructed corrugation ends to form therewith a diagonal channel for the flow of a temperature conditioning fluid, the depth of said box-like structures being approximately the same as the depth of said corrugations, whereby the flow of said fluid through said parallel ducts and connecting channels will be in intimate heat conducting relation with the receptacle contents.

4. In a receptacle of the class described, the combination of a sheet metal shell, a corrugated sheet metal wall secured and sealed to said shell along its valleys to provide a series of independent parallel ducts for conveying temperature conditioning fluid in intimate contact with said shell, said corrugations extending around said shell and terminating in opposing open ends located upon opposite sides of an intervening space extending at substantially right angles to the corrugations, means for closing certain of said open ends on opposite sides of said space and at opposite ends of said series, inlet and outlet connections communicating with said closed ducts, and a sheet metal piece pressed to form a diagonal channel covering, said pressed piece being positioned against said shell in said space and forming with said shell an inclined channel in line with offset unobstructed parallel duct ends, said piece being secured and sealed along its edges to said shell and at other points to said duct ends to confine the flow of fluid in intimate heat conducting relation with the receptacle contents.

5. In a receptacle of the class described, the combination of a sheet metal shell, a corrugated sheet metal wall secured and sealed to said shell along its valleys to provide a series of independent parallel ducts for conveying a temperature conditioning fluid in intimate contact with said shell, said corrugations extending around said shell and terminating in opposing open ends located upon opposite sides of an intervening space extending at substantially right angles to the corrugations, means for closing certain of said open ends on opposite sides of said space and at opposite ends of said series, inlet and outlet connections communicating with said closed ducts and a sheet metal piece pressed to form a diagonal channel covering, said pressed piece having its outer surface substantially flush with the tops of said corrugation ridges and being positioned against said shell in said space and forming with said shell an inclined channel in line with offset parallel unobstructed duct ends, said piece being secured and sealed along its edges to said shell and at other points to said duct ends to confine the flow of fluid in intimate heat conducting relation with the receptacle contents.

6. In a receptacle of the class described, the combination of a sheet metal shell, a corrugated sheet metal wall secured and sealed to said shell along its valleys to provide a series of independent parallel ducts for conveying a temperature conditioning fluid in intimate contact with said shell, said corrugations extending around said shell and terminating in opposing open ends located upon opposite sides of an intervening space extending at substantially right angles to said corrugations, said series being divided into a plurality of zones and each zone comprising a plurality of parallel ducts, means for closing certain of said open ends on opposite sides of said space and at opposite ends of each zone, diagonal channel means for each zone located in said intervening space and interconnecting the remaining offset unobstructed duct ends of that particular zone to provide for a zonal flow of the temperature conditioning fluid, an outer enclosing wall, an inlet for each zone communicating with the said closed duct ends located on one side of said intervening space, an outlet for each zone communicating with the other closed duct ends located on the other side of said intervening space, said outlet comprising a sheet metal channel-forming passage extending in a lengthwise direction parallel to said shell and communicating with said zonal outlets through openings in the appropriate corrugations and passing over said intermediate corrugations in a broad narrow passageway located wholly within the wall of the receptacle between its inner shell and its outer wall and terminating beyond the same, and insulation within said outer enclosing wall on the one hand and said corrugated wall and outlet channel wall on the other.

TIMOTHY MOJONNIER.
OLIVER W. MOJONNIER.

REFERENCES CITED

The following references are of record in the file of this patent:

UNITED STATES PATENTS

| Number | Name | Date |
|---|---|---|
| Re. 15,665 | Lehman | July 31, 1923 |
| 1,271,657 | Bock, Sr. | July 9, 1918 |
| 1,804,624 | King | May 12, 1931 |
| 1,968,780 | Kaestner | July 31, 1934 |
| 2,064,141 | Askin | Dec. 15, 1936 |
| 2,200,426 | Lehman | May 14, 1940 |
| 2,277,526 | Mojonnier | Mar. 24, 1942 |
| 2,356,778 | Morrison | Aug. 29, 1944 |
| 2,386,613 | Johnson | Oct. 9, 1945 |

FOREIGN PATENTS

| Number | Country | Date |
|---|---|---|
| 567,443 | Germany | Sept. 30, 1930 |